(12) United States Patent
Cross

(10) Patent No.: US 11,201,483 B2
(45) Date of Patent: Dec. 14, 2021

(54) PORTABLE POWER BANK SYSTEM

(71) Applicant: GOPLUG BAGS, INC., Sandy, UT (US)

(72) Inventor: Joshua Seth Mark Cross, Magna, UT (US)

(73) Assignee: GOPLUG BAGS, INC., Sandy, UT (US)

(*) Notice: Subject to any disclaimer, the term of this patent is extended or adjusted under 35 U.S.C. 154(b) by 300 days.

(21) Appl. No.: 15/974,031

(22) Filed: May 8, 2018

(65) Prior Publication Data

US 2018/0358830 A1 Dec. 13, 2018

Related U.S. Application Data

(63) Continuation of application No. 15/462,504, filed on Mar. 17, 2017, now Pat. No. 9,966,771.

(60) Provisional application No. 62/310,458, filed on Mar. 18, 2016.

(51) Int. Cl.
| | |
|---|---|
| *H02J 7/00* | (2006.01) |
| *H04M 19/08* | (2006.01) |
| *H02J 7/34* | (2006.01) |
| *H04M 19/00* | (2006.01) |
| *H04M 1/02* | (2006.01) |
| *H04W 84/12* | (2009.01) |

(52) U.S. Cl.
CPC .......... *H02J 7/0044* (2013.01); *H02J 7/0021* (2013.01); *H02J 7/0042* (2013.01); *H02J 7/0063* (2013.01); *H02J 7/342* (2020.01); *H04M 19/00* (2013.01); *H04M 19/08* (2013.01); *H02J 7/00* (2013.01); *H02J 7/00034* (2020.01); *H02J 2007/0067* (2013.01); *H04M 1/0202* (2013.01); *H04W 84/12* (2013.01)

(58) Field of Classification Search
CPC ..................................................... H02J 7/0054
USPC .......................................................... 320/113
See application file for complete search history.

(56) References Cited

U.S. PATENT DOCUMENTS

| | | | | |
|---|---|---|---|---|
| 8,593,108 | B2* | 11/2013 | Ferber | G06F 1/1628 320/114 |
| 10,574,071 | B2* | 2/2020 | Zhijian | H02J 7/342 |
| 2010/0231161 | A1* | 9/2010 | Brown | H02J 7/0042 320/101 |
| 2012/0229071 | A1* | 9/2012 | Schuessler | H01M 10/46 320/101 |

(Continued)

*Primary Examiner* — Jerry D Robbins
(74) *Attorney, Agent, or Firm* — Maschoff Brennan

(57) ABSTRACT

In one embodiment, a portable power bank system may include a portable power bank and a software application. The portable power bank may include a power bank housing, one or more batteries internal to the power bank housing, and one or more electrical receptacles that are defined by the power bank housing. Each of the one or more electrical receptacles may be configured to selectively provide electrical power from the one or more batteries. The software application may include one or more computer-readable instructions that are configured, when executed by one or more processors of a portable computing device, to cause the portable computing device to communicate with the portable power bank over a wireless network to receive information regarding a current state of the portable power bank and to present the current state of the portable power bank on the portable computing device.

18 Claims, 21 Drawing Sheets

(56) References Cited

U.S. PATENT DOCUMENTS

| | | | |
|---|---|---|---|
| 2013/0249673 A1* | 9/2013 | Ferrari | G08C 17/02 340/8.1 |
| 2015/0244306 A1* | 8/2015 | Estes | H02S 40/32 700/287 |
| 2017/0090530 A1* | 3/2017 | Filser | G06F 1/1632 |
| 2017/0130951 A1* | 5/2017 | Carrasco-Slind | A45C 15/00 |

* cited by examiner

PORTABLE POWER BANK SYSTEM

BACKGROUND

Portable electronic devices are increasing in popularity. Examples of portable electronic devices include laptops, tablet computers, cellular smartphones, cellular "dumb" phones, music players, video players, speakers, projectors, storage devices, cameras, video recorders, etc. While varying in their functionality and features, one thing that most portable electronic devices have in common is one or more internal rechargeable batteries, which require the electronic device to be regularly recharged by being plugged into a power outlet.

Unfortunately, aging infrastructure in public spaces such as airports, bus terminals, rest stops, museums, and parks were not originally designed to accommodate the dramatic increase in the need for power outlets that has resulted from the increasing popularity of portable electronic devices. Therefore, there generally are not enough power outlets, or the right type of power outlets, to meet the demand for power outlets in most of these public spaces.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Embodiments disclosed herein relate to a power bank system. Some embodiments may help solve the problem of not enough power outlets, or not enough of the right type of power outlets, to meet the demand for power outlets in many public spaces. This problem may be solved by a portable power bank that can be carried in a bag and/or managed using an app on a portable computing device, such as a smartphone or tablet. The portable power bank can be employed to charge portable electronic devices while on the go.

Figure 1:
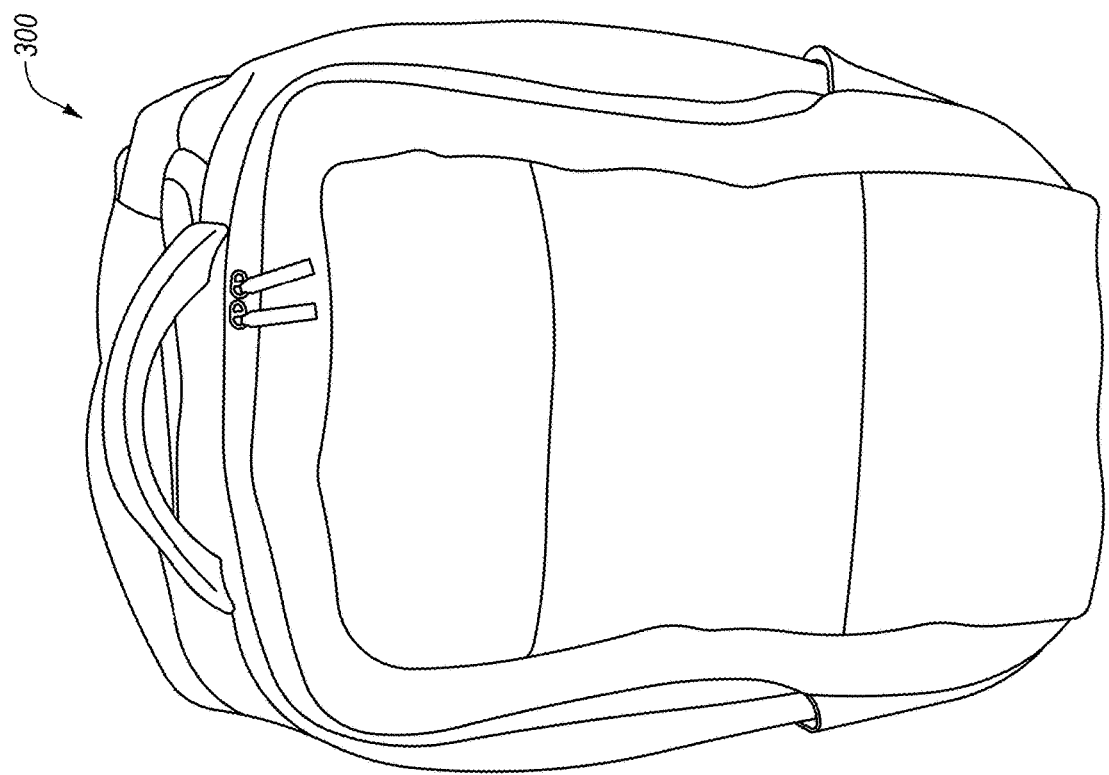
FIG. 1 is a perspective view of a power bank system, including a power bank and docking station, a bag for carrying the power bank and/or the docking station, and an app running on a smartphone for managing the power bank and/or docking station.
Figure 1:
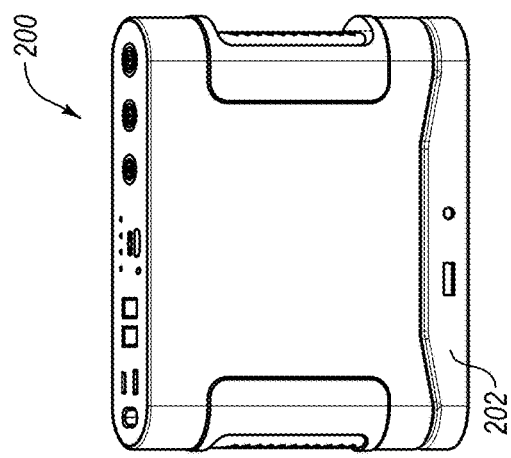
Figure 1:

FIG. 1 is a perspective view of a power bank system 100, including a power bank 200 and a docking station 202, a bag 300 for carrying the power bank 200 and/or the docking station 202, and an app 400 running on a smartphone 402 for managing the power bank 200 and/or the docking station 202.

In some embodiments, the power bank 200 may be configured to dock with the docking station 202 such that the power bank 200 is configured to provide electrical power to the docking station 202 while the power bank 200 is docked with the docking station 202.

In some embodiments, the bag 300 may be configured with one or more compartments into which the power bank 200 and/or the docking station 202 may be positioned. While positioned within a compartment of the bag 300 or outside the bag 300, one or more portable electronic devices (not shown) may be plugged into the power bank 200 and/or the docking station 202 in order to recharge the one or more portable electronic devices. In addition, the power bank 200 may be configured with wireless recharging capability such that portable electronic devices may be recharged by the power bank 200 by placing the portable electronic devices in close proximity to the power bank 200 but without actually plugging the portable electronic devices into the power bank 200.

In some embodiments, the app 400 running on the smartphone 402 may be configured to communicate with the power bank 200 and/or the docking station 202 over a network, such as a Personal Area Network (PAN) (e.g., Bluetooth), a cellular network (CDMA or GSM), or other wireless network (e.g., a Wi-Fi wireless network). This communication may facilitate the sharing of information regarding a current state of the power bank 200 and/or the docking station 202 to the app 400 and/or in order to control functionality of the power bank 200 and/or the docking station 202 from the app 400.

Figure 2A:
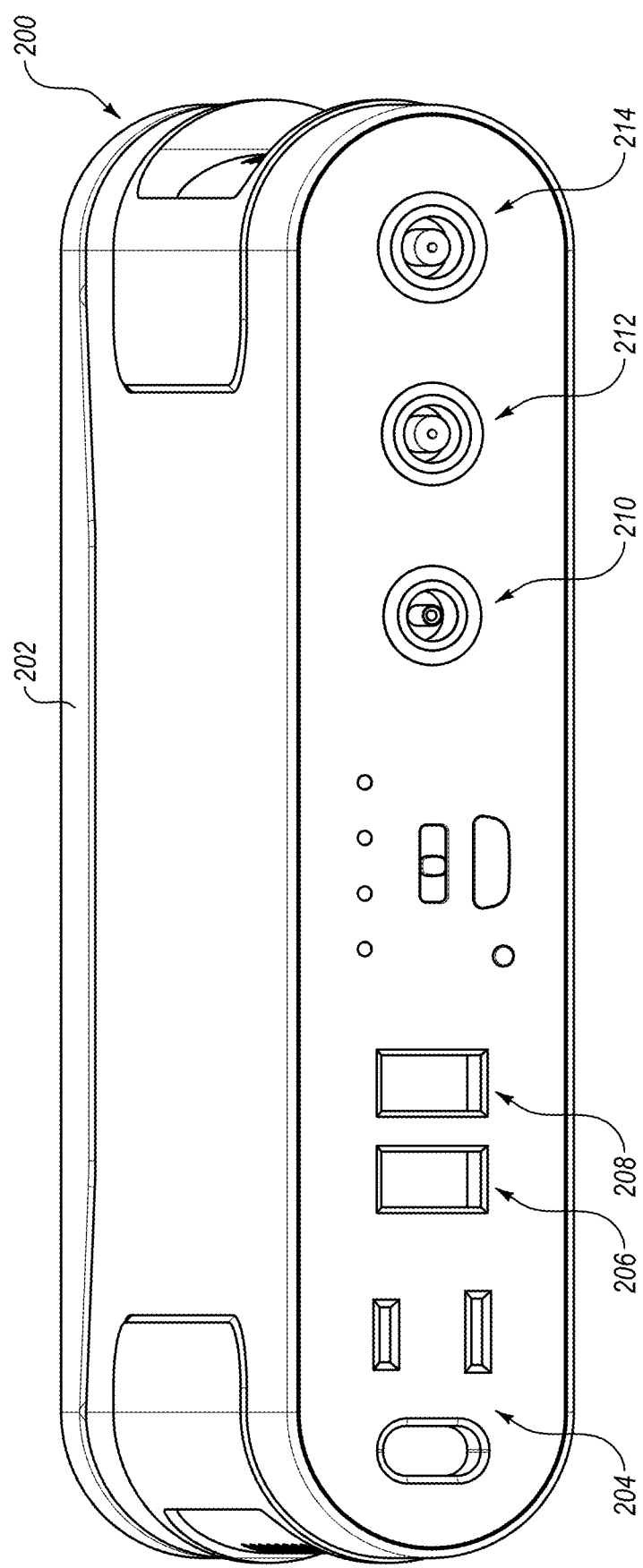
FIG. 2A is a perspective view of the power bank docked with the docking station of FIG. 1.

FIG. 2A is a perspective view of the power bank 200 docked with the docking station 202. In some embodiments, the power bank 200 may include one or more electrical receptacles each configured to provide electrical power to a power cord (not shown) that is plugged into the electrical receptacle from one or more power storage devices (not shown), such as one or more batteries, internal to the power bank 200. For example, the electrical receptacles of the power bank 200 may include a standard electrical outlet 204 (which may instead be a universal electrical outlet), two USB electrical receptacles 206 and 208, a 12-volt electrical receptacle 210, and a 19-volt electrical receptacle 212. In some embodiments, the power bank 200 may also include an electrical receptacle 214 configured to receive electrical power from a power source (not shown) via a power cord (not shown) that is plugged into the electrical receptacle 214. The power source may be, for example, a standard wall outlet, a USB electrical receptacle, or a solar panel.

Figure 2B:
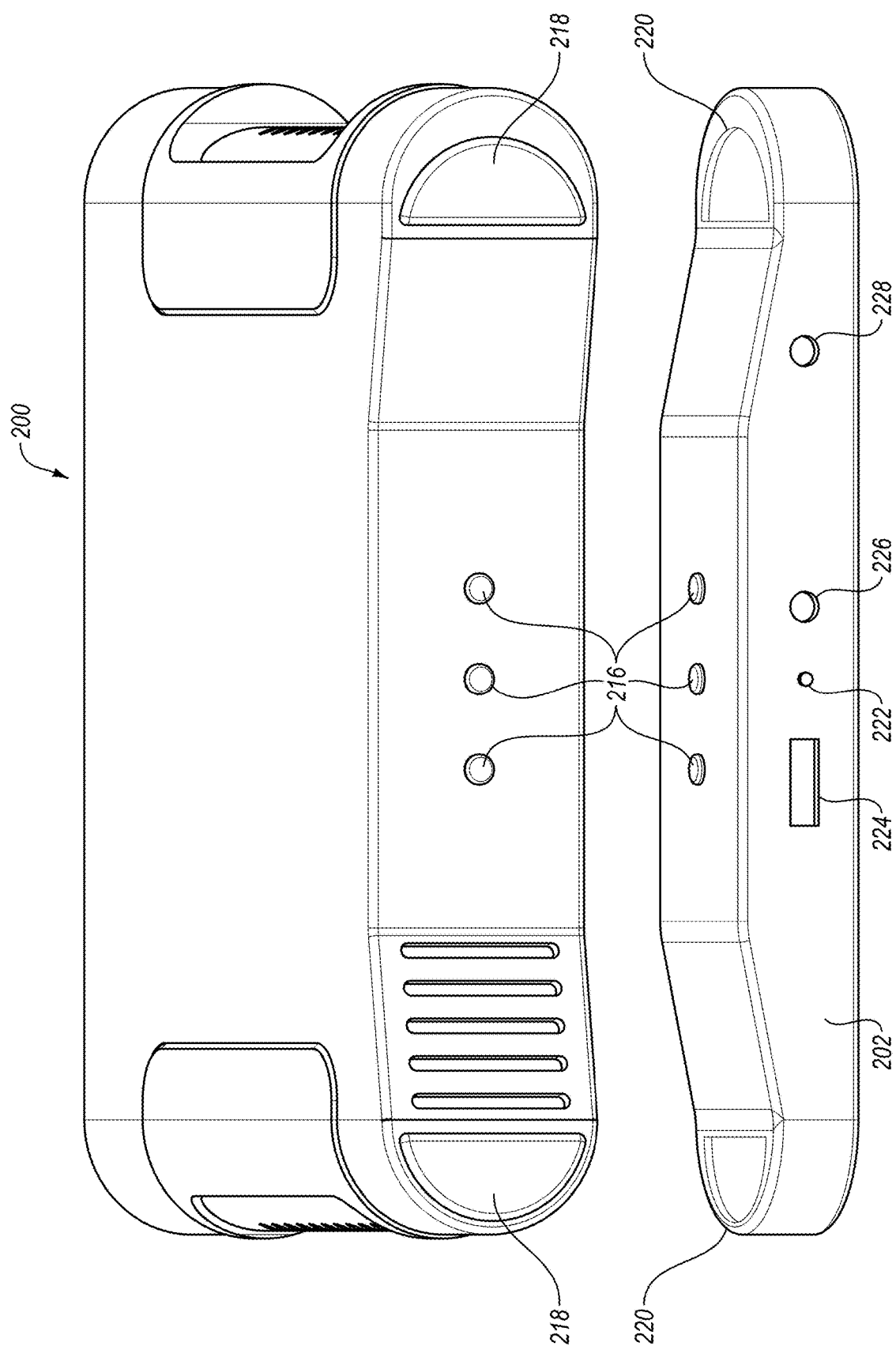
FIG. 2B is an exploded perspective view of the power bank undocked from the docking station of FIG. 1.

FIG. 2B is an exploded perspective view of the power bank 200 undocked from the docking station 202. In some embodiments, the docking station 202 may be a magnetic docking station and the power bank 200 may be configured to dock with the docking station 202 using a magnetic field to hold the power bank 200 in contact with the docking station 202 in order to enable transfer of electrical power from the power bank 200 to the docking station 202. For example, these one or more magnetic fields may be created by magnets 216 included in or on the docking station 202, in or on the power bank 200, or both. In some embodiments, the magnets 216 may also provide electrical contacts through which power may flow from the power bank 200 to the docking station 202, and vice versa.

In some embodiments, the docking station 202 may additionally or alternatively be configured to dock with the power bank 200 using mechanical or other docking structures. For example, the power bank 200 may include protrusions 218 configured to mate with corresponding depressions 220 included on the docking station 202. The mating of these protrusions 218 and depressions 220 may be employed to assist the one or more magnetic fields in holding the power bank 200 in contact and in alignment with the docking station 202.

In some embodiments, the docking station 202 may additionally or alternatively include a power indicator 222 that is configured to indicate whether electrical power is being provided from the power bank 200 to the docking station 202.

In some embodiments, the docking station 202 may additionally or alternatively include one or more electrical receptacles, each configured to provide electrical power from the power bank 200 to a power cord (not shown) that is plugged into the electrical receptacle from one or more power storage devices (not shown) internal to the power bank 200. For example, the electrical receptacles of the docking station 202 may include a USB electrical receptacle 224 and a 12-volt electrical receptacle 226.

In some embodiments, the docking station may additionally or alternatively include an electrical receptacle 228 configured to receive electrical power from a power source (not shown) via a power cord (not shown) that is plugged into the electrical receptacle 228. The power source may be, for example, a standard wall outlet, a USB electrical receptacle, or a solar panel. In these embodiments, the docking station 202 may transfer the electrical power from the power source to the docked power bank 200 via electrical contacts on the docking station 202 and corresponding electrical contacts on the power bank 200 that make contact and mate during docking, such as the magnets 216.

In some embodiments, the docking station 202 may additionally or alternatively have one or more power storage devices (not shown), such as one or more batteries, internal to the docking station 202. In these embodiments, the docking station 202 may be configured with components and functionality configured to be powered independently of, and operate independently of, the power bank 200. These components of an independently-powered docking station 202 may include a light, a digital video camera, a microphone, a motion detector (e.g., to trigger the light, the digital video camera, and/or microphone), a radio transceiver or cellular phone transceiver, a satellite phone, an emergency transponder (e.g., to send a distress signal), a speaker, a heater (e.g., to warm hands in a cold climate), an electrocution device (e.g., a Taser to ward off an attacker), an AM/FM radio, a defibrillator, a car jump starter kit, a locating beacon or GPS receiver (e.g., to avoid getting lost in wilderness settings), a clock, a stop watch, a display (e.g., an LCD display to view photographs and pictures captured by the digital video camera), and a digital thermometer. It is understood that any of these components and functionality may additionally or alternatively be included in the power bank 200 itself.

FIGS. 3A-3G are various perspective views of the bag 300. As disclosed in FIGS. 3A-3G, in some embodiments, the bag 300 may include a first interior compartment 302 and a second interior compartment 304. The first interior compartment 302 may be sized and configured to contain the power bank 200 while docked with the docking station 202 (see FIG. 3D).

Figure 3A:
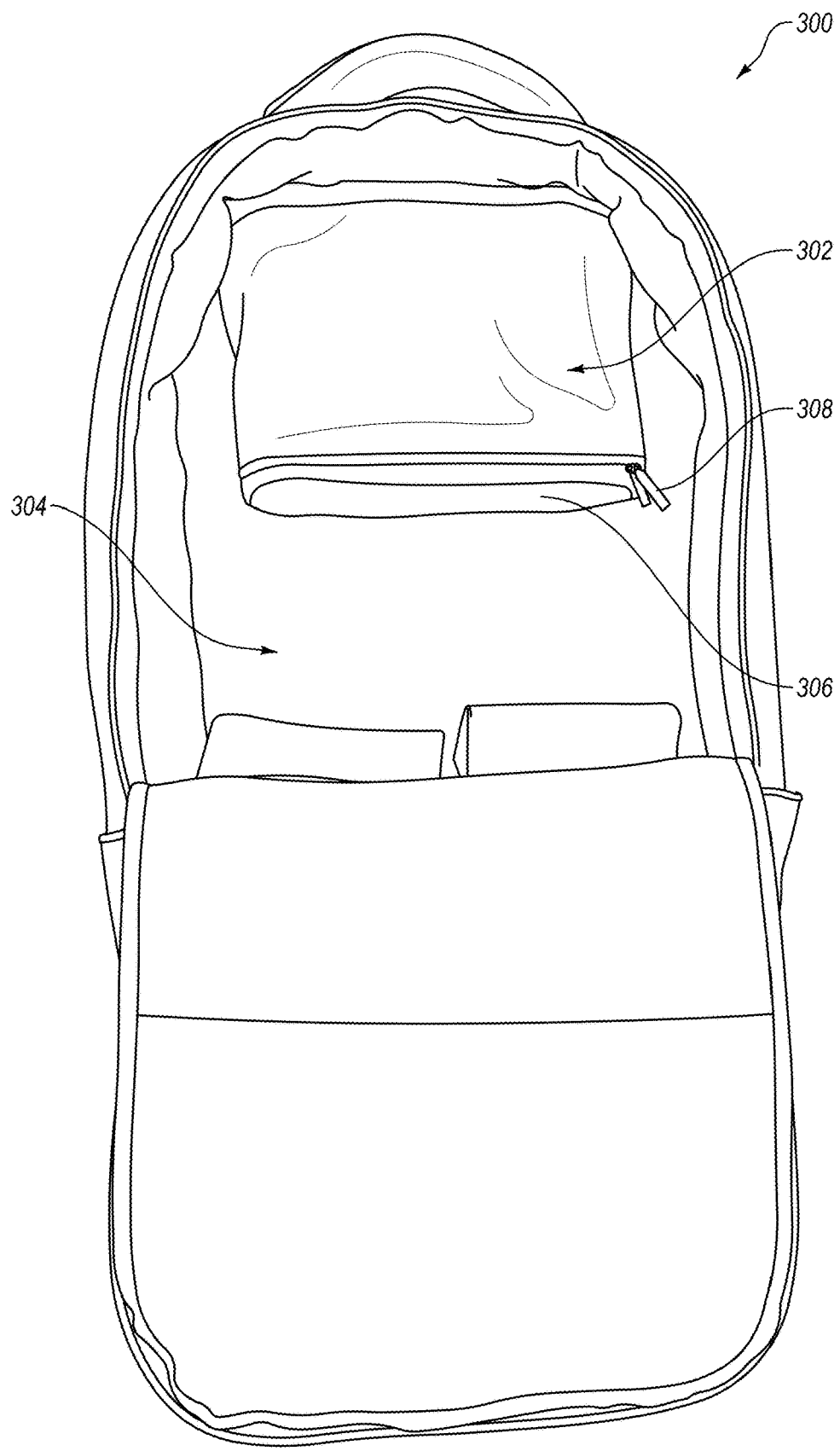
FIGS. 3A-3G are various perspective views of the bag of FIG. 1.
Figure 3B:
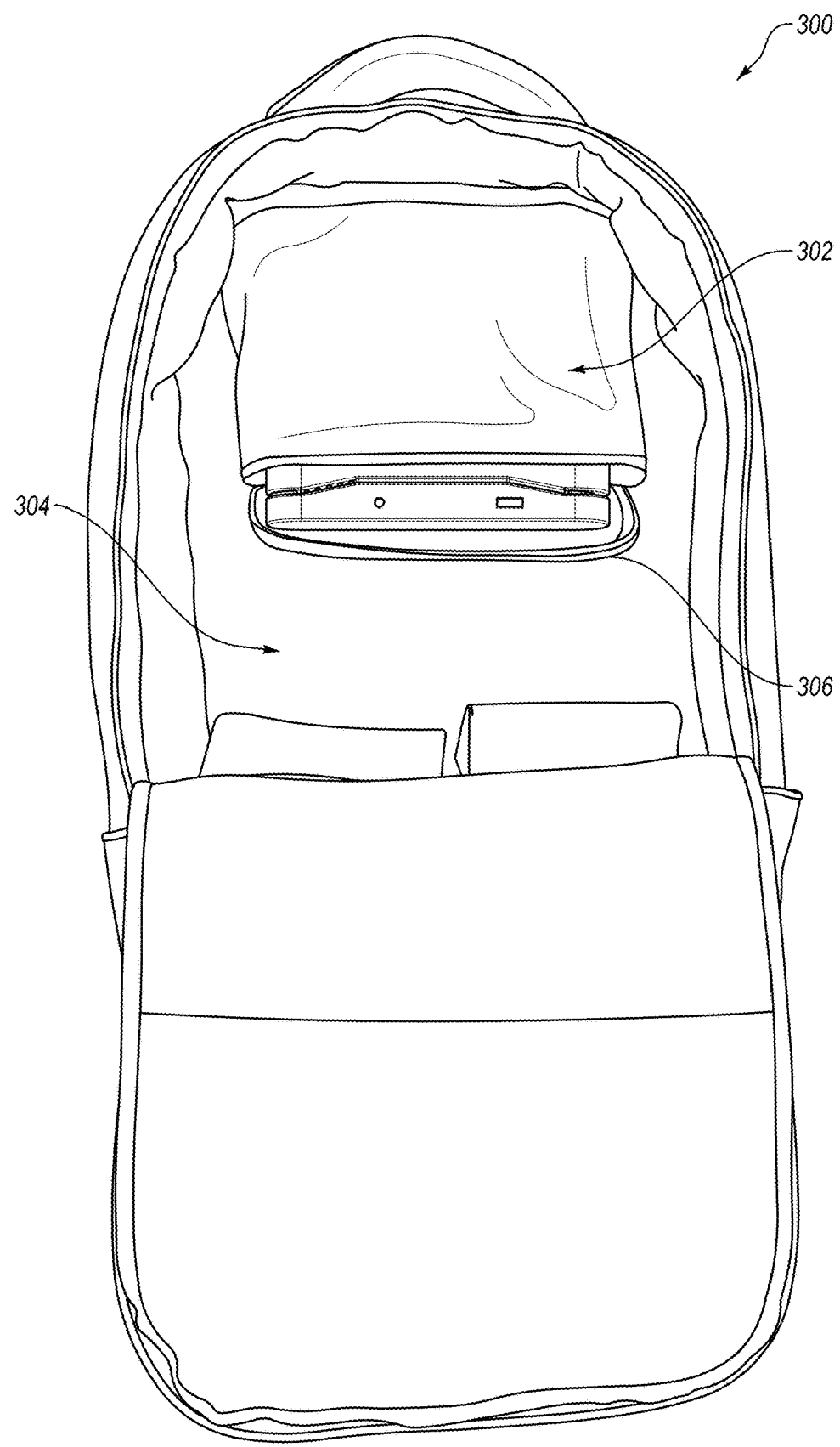
Figure 3C:
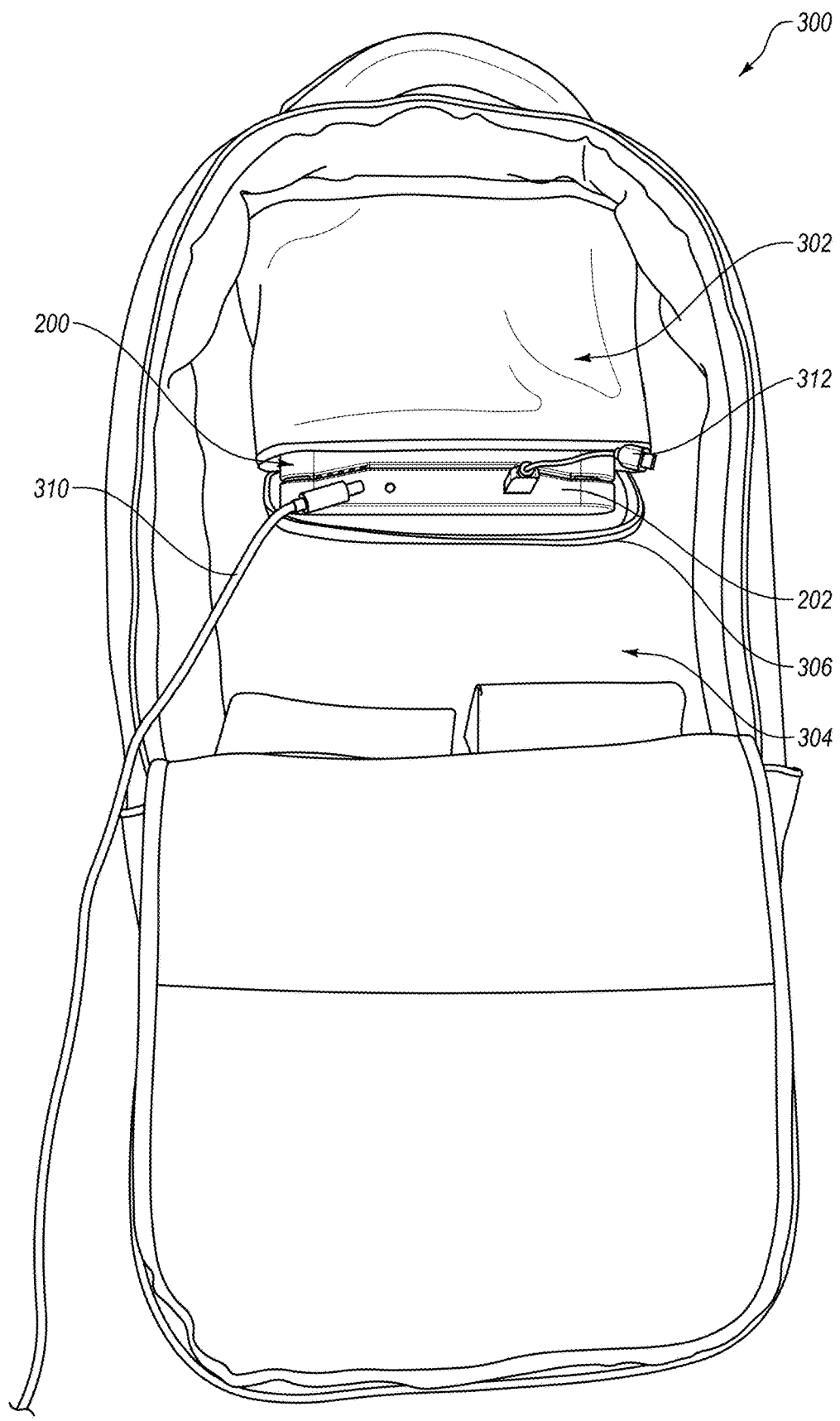
Figure 3D:
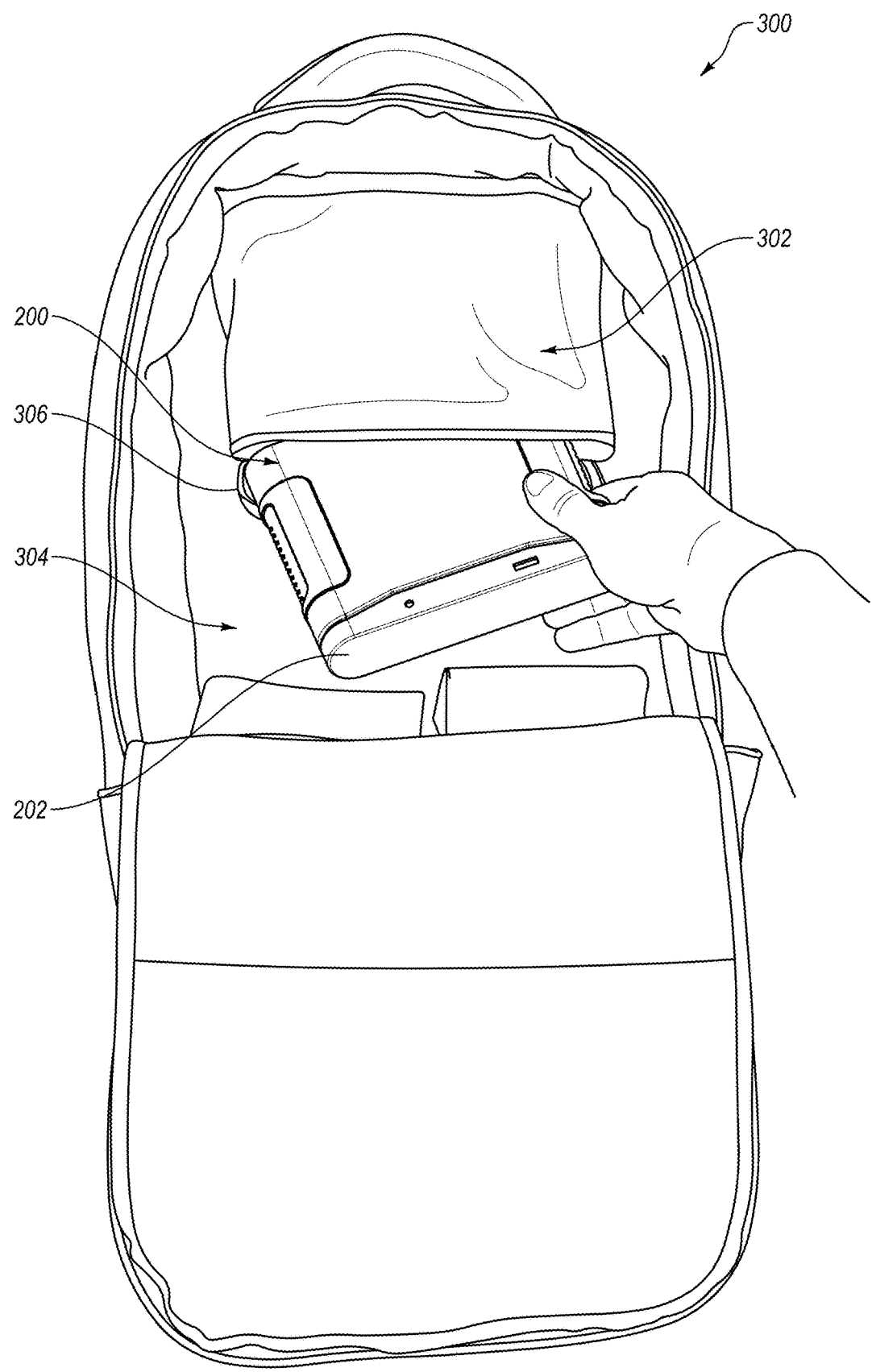

In some embodiments, as disclosed in FIGS. 3A-3D, the bag 300 may include a first removable compartment wall 306 at least partially defining the first interior compartment 302 and separating the first interior compartment 302 from the second interior compartment 304. For example, the first removable compartment wall 306 may be removable by unzipping a zipper 308 (see FIG. 3A) in order to fold back the first removable compartment wall 306 (see FIG. 3B). Once the first removable compartment wall 306 is removed, and while the power bank 200 is docked with the docking station 202 and remains contained in the first interior compartment 302, either the electrical receptacles of the docking station 202 are exposed to the second interior compartment 304 (if the docking station is positioned at the bottom of the first interior compartment 302, as shown in FIG. 3B) or the electrical receptacles of the power bank 200 would be exposed to the second interior compartment 304 (if the docking station were positioned at the top of the first interior compartment 302). The exposing of electrical receptacles to the second interior compartment 304 by removing the first removable compartment wall 306 may enable one or more power cords 310 and 312 to be plugged into the one or more electrical receptacles. This may allow, for example, portable electronic devices (not shown) contained in the second interior compartment 304 to be powered or charged, via power cords plugged into the exposed electrical receptacles, without removing the portable electronic devices from the second interior compartment 304. Further, as disclosed in FIG. 3D, the first removable compartment wall 306, once removed, may create a large enough opening to insert or remove the power bank 200 docked with the docking station 202 from the first interior compartment 302.

Figure 3E:
Figure 3F:
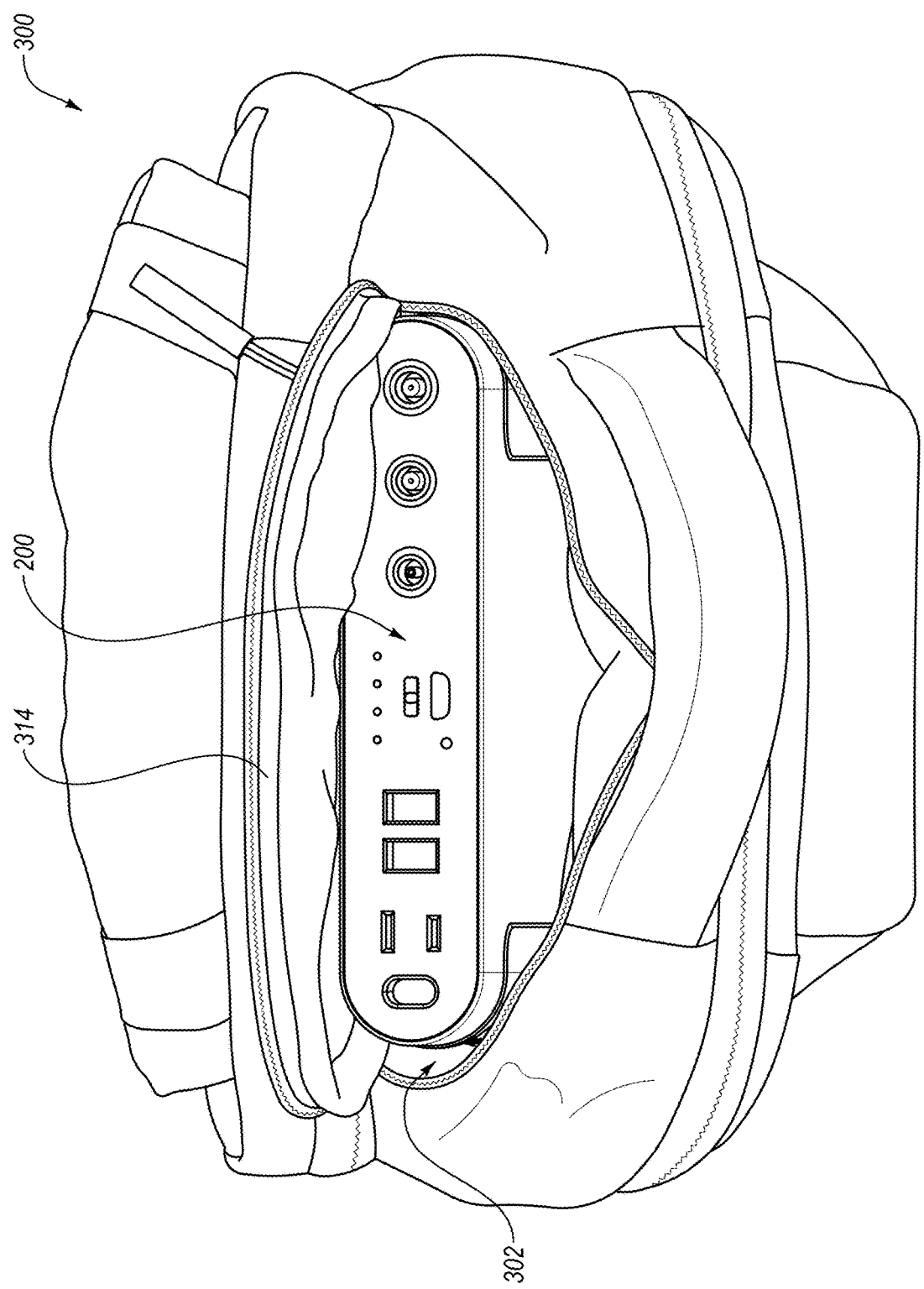
Figure 3G:
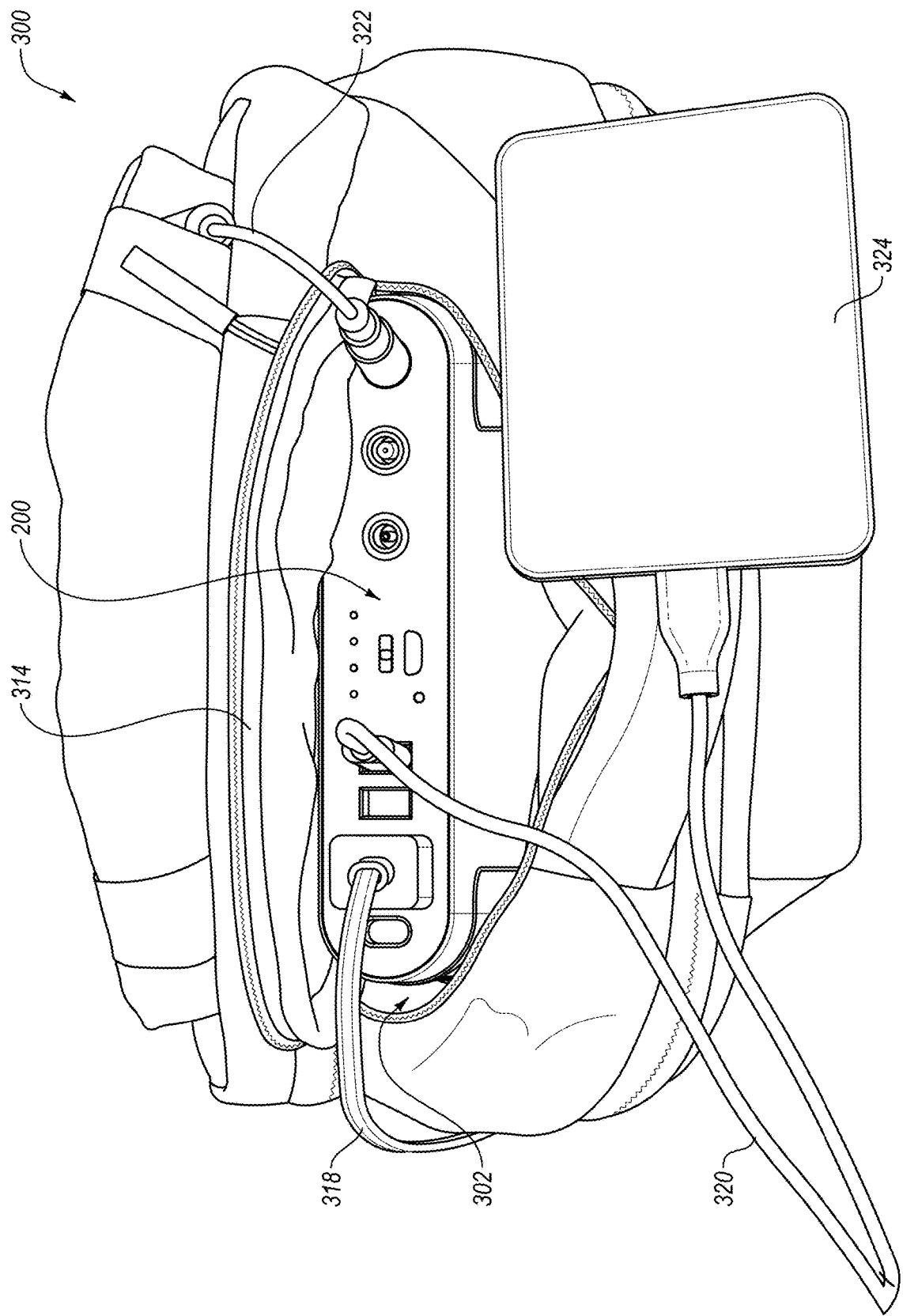

In some embodiments, as disclosed in FIGS. 3E-3G, the bag 300 may include a second removable compartment wall 314 at least partially defining the first interior compartment 302 and separating the first interior compartment 302 from an exterior of the bag 300. For example, the second removable compartment wall 314 may be removable by unzipping a zipper 316 (see FIG. 3E) in order to fold back the second removable compartment wall 314 (see FIG. 3F). Once the second removable compartment wall 314 is removed, and while the power bank 200 docked with the docking station 202 remains contained in the first interior compartment 302, either the electrical receptacles of the power bank 200 are exposed to the exterior of the bag 300 (if the docking station is positioned at the bottom of the first interior compartment 302, as disclosed in FIG. 3F) or the electrical receptacles of the docking station 202 would be exposed to the exterior of the bag 300 (if the docking station 202 were to be positioned at the top of the first interior compartment 302). The exposing of electrical receptacles to the exterior of the bag 300 by removing the second removable compartment wall 314 may enable one or more power cords 318, 320, and 322 to be plugged into the one or more electrical receptacles. This may allow, for example, a portable electronic device 324 that is external to the bag 300 to be powered via the power cord 320 that is plugged into an exposed electrical receptacle. This may also allow, for example, the power bank 200 to be charged from a power source (not shown) via a power cord 322 that is plugged into an electrical receptacle. Further, as disclosed in FIGS. 3F and 3G, the second removable compartment wall 314, once removed, may create a large enough opening to insert or remove the power bank 200, docked with the docking station 202, from the first interior compartment 302.

In some embodiments, the docking station 202 may be attached to a compartment wall, such as the first removable compartment wall 306, the second removable compartment wall 314, or another compartment wall. This attachment may be permanent, such as an attachment via permanent fasteners such as rivets, or the attachment may be removable, such as an attachment via Velcro or elastic loops, fabric loops, or other removable fasteners such as snaps.

FIGS. 4A-4k illustrate various user interfaces of the app 400 running on the smartphone 402. As noted previously, the app 400 may be configured to communicate with the power bank 200 and/or the docking station 202 over a wireless network.

Figure 4A:
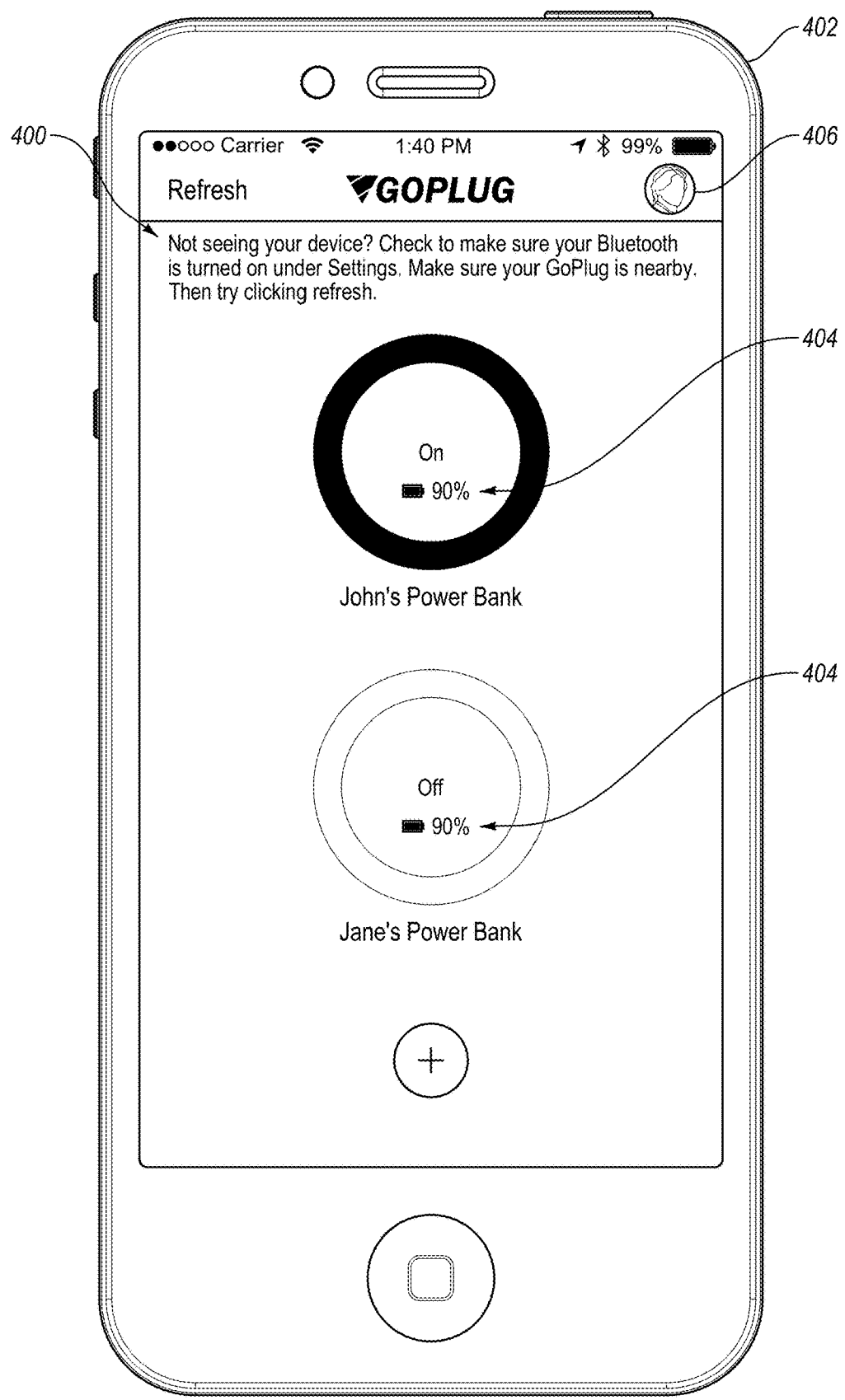
FIGS. 4A-4k are various views of user interfaces of the app running on the smartphone of FIG. 1.
Figure 4B:
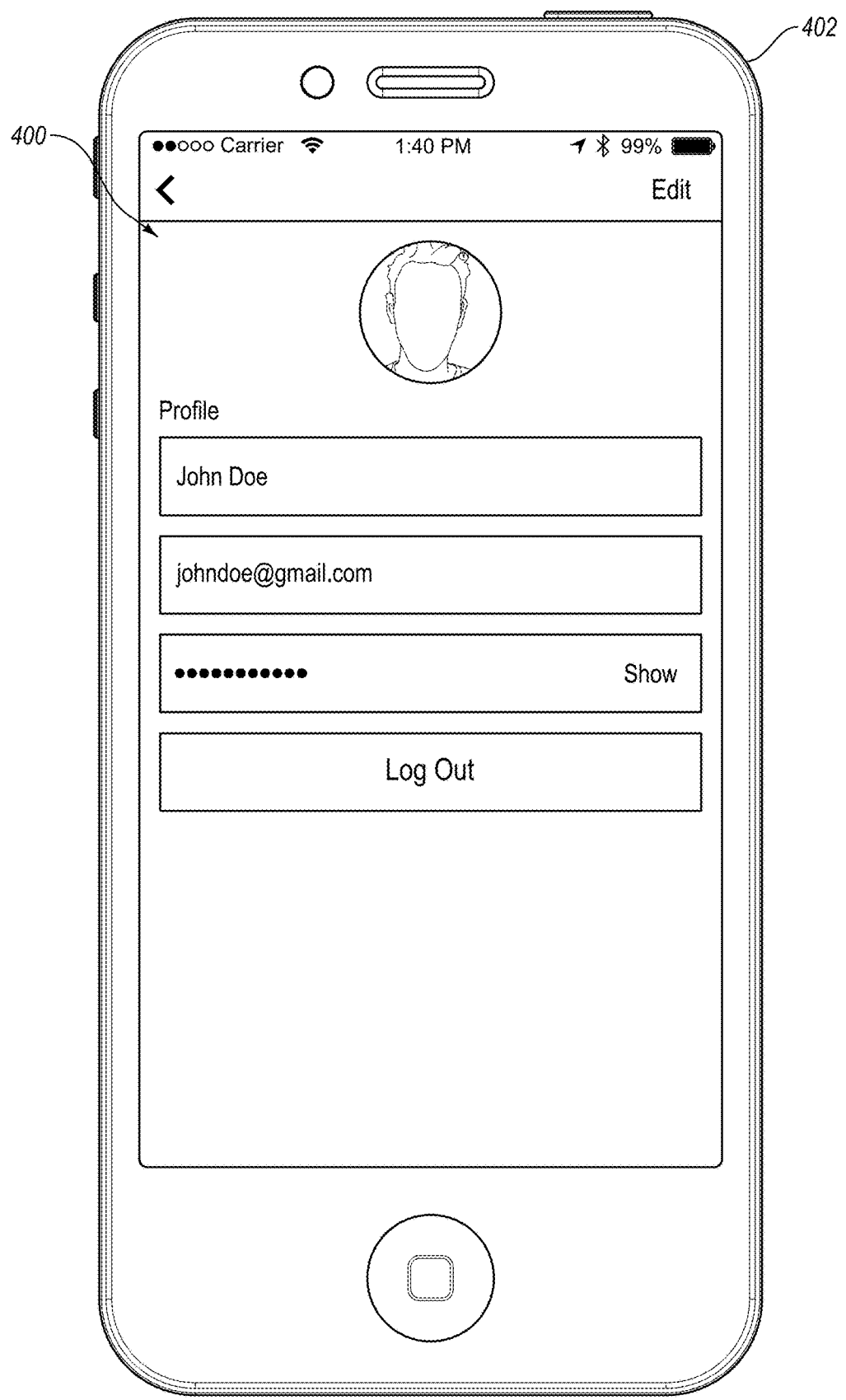

In some embodiments, as disclosed in FIG. 4A, the app 400 may be configured to receive a current charge percentage 404 of the power bank 200, and then present the current charge percentage 404 on a user interface of the app 400. Also, the app 400 may be configured to control the functionality of multiple power banks, such as "John's Power Bank" and "Jane's Power Bank," as disclosed in FIG. 4A. The app 400 may be configured to switch between controlling the functionality of "John's Power Bank" and "Jane's Power Bank" by waiting for a user to select the area within the circle associated with the desired power bank, which may take the user to the user interface disclosed in FIG. 4C. Alternatively, by selecting the picture 406 of the user in FIG. 4A, the user is taken to a user interface disclosed in FIG. 4B, which allows the user to edit a user profile and log in or log out of an online account associated with the app 400.

Figure 4C:
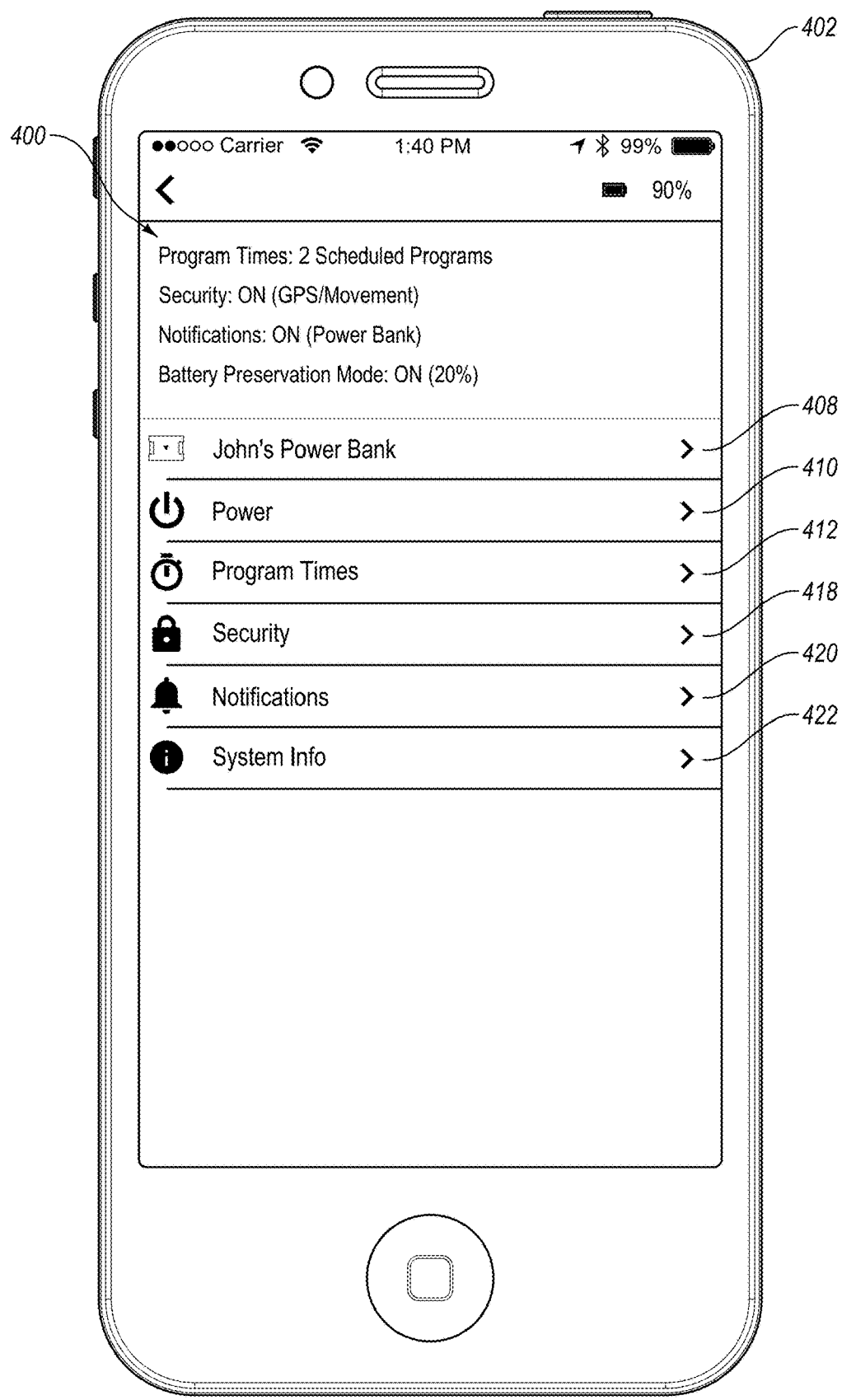
Figure 4D:
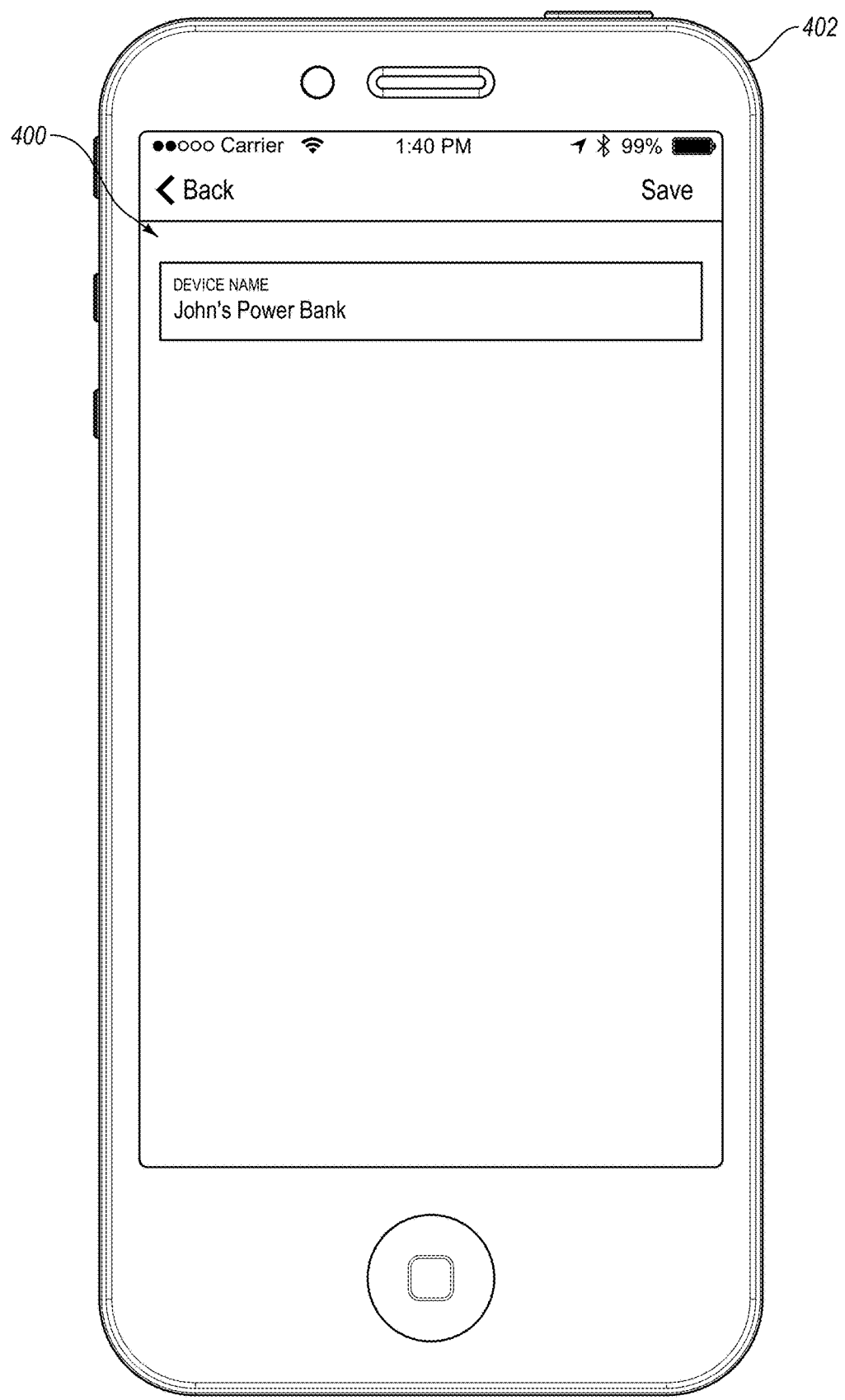

In some embodiments, as disclosed in FIG. 4C, the app 400 may be configured to allow a user to select from various options. For example, by selecting an option 408 in FIG. 4C, the user is taken to a user interface disclosed in FIG. 4D, where the user can edit the name of the current power bank.

Figure 4E:
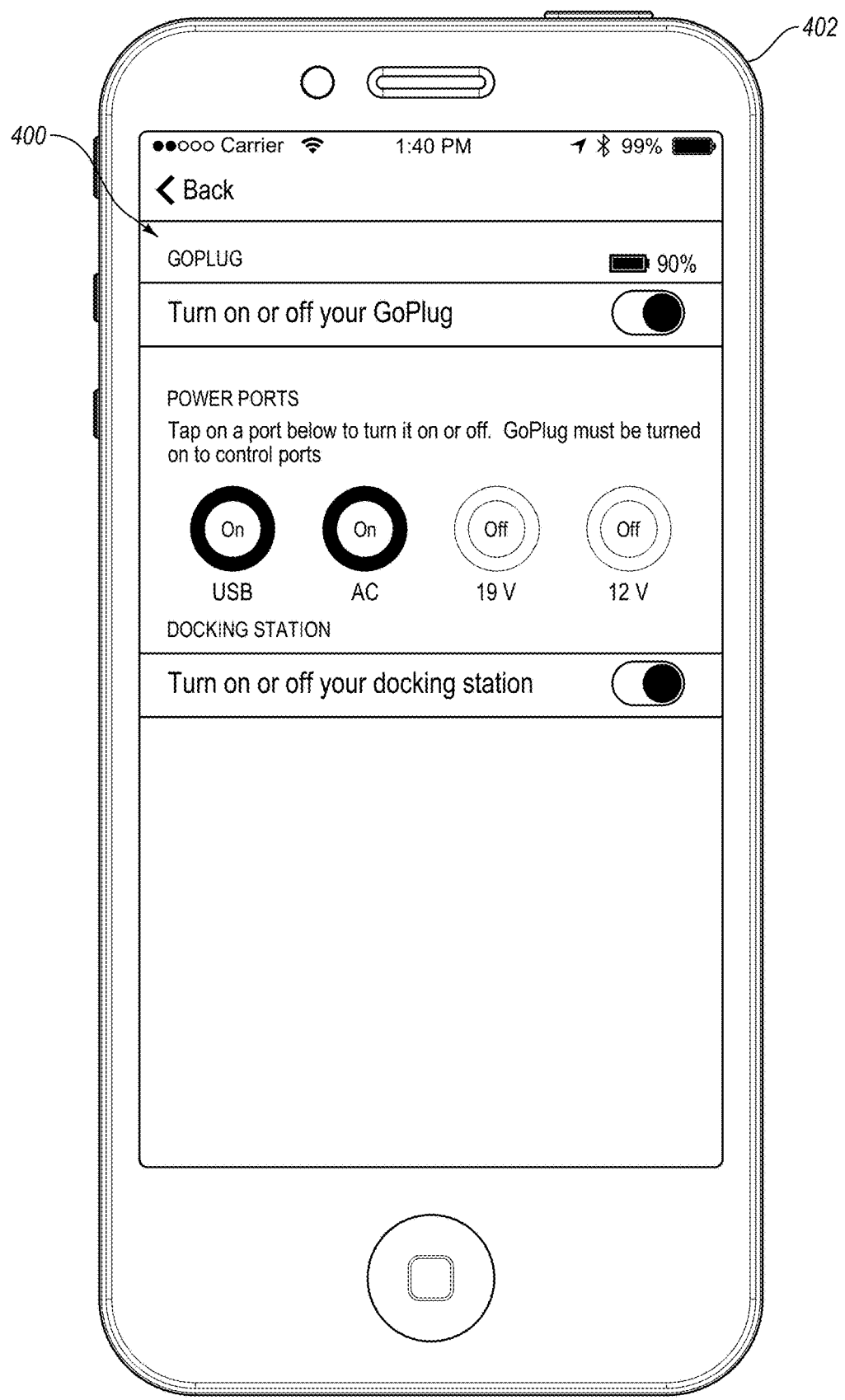

Alternatively, by selecting an option 410 in FIG. 4C, the user is taken to a user interface disclosed in FIG. 4E, where the user can turn the power bank on or off, turn one or more power receptacles of the power bank on or off, and/or turn the docking station on or off.

Figure 4F:
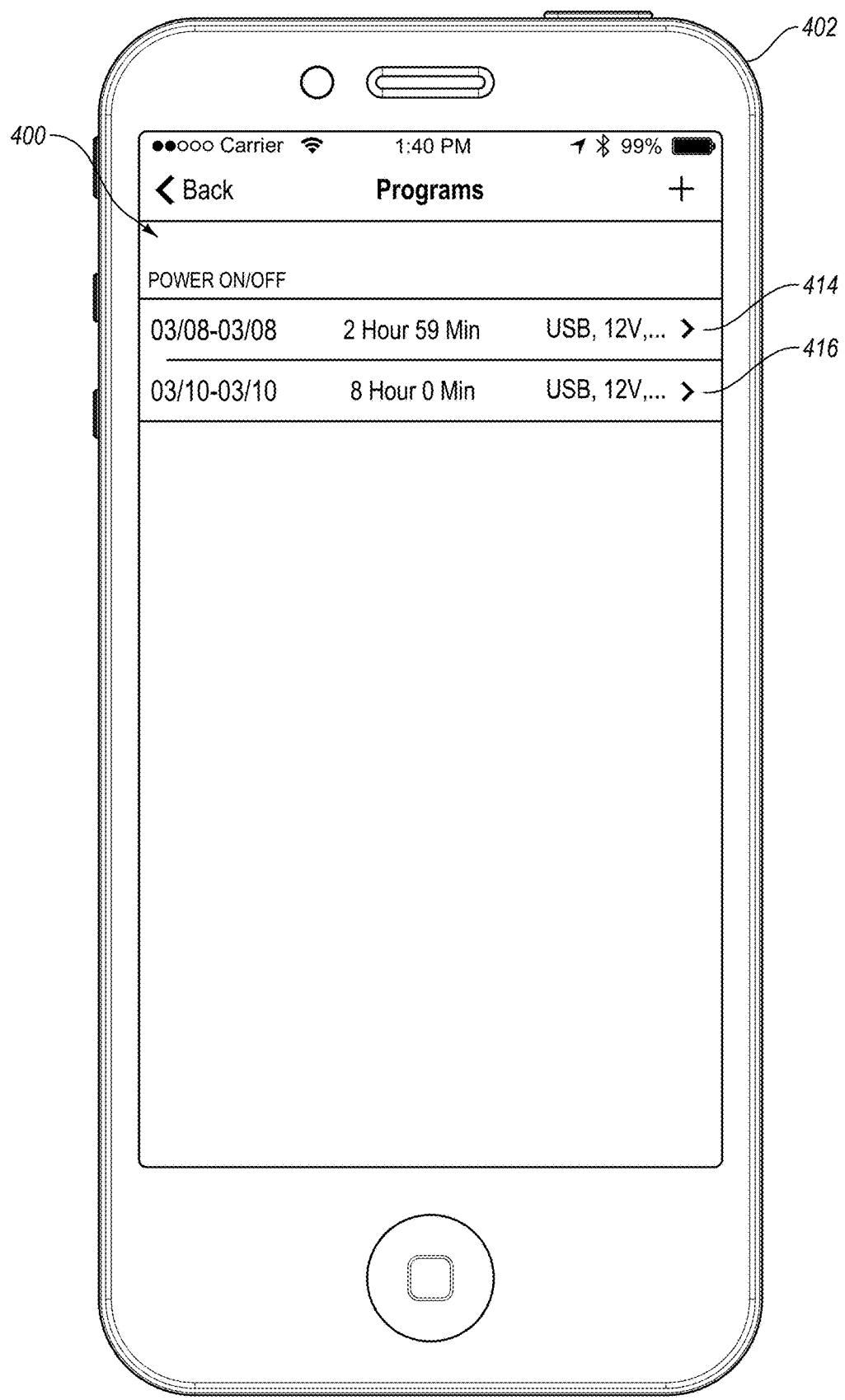
Figure 4G:
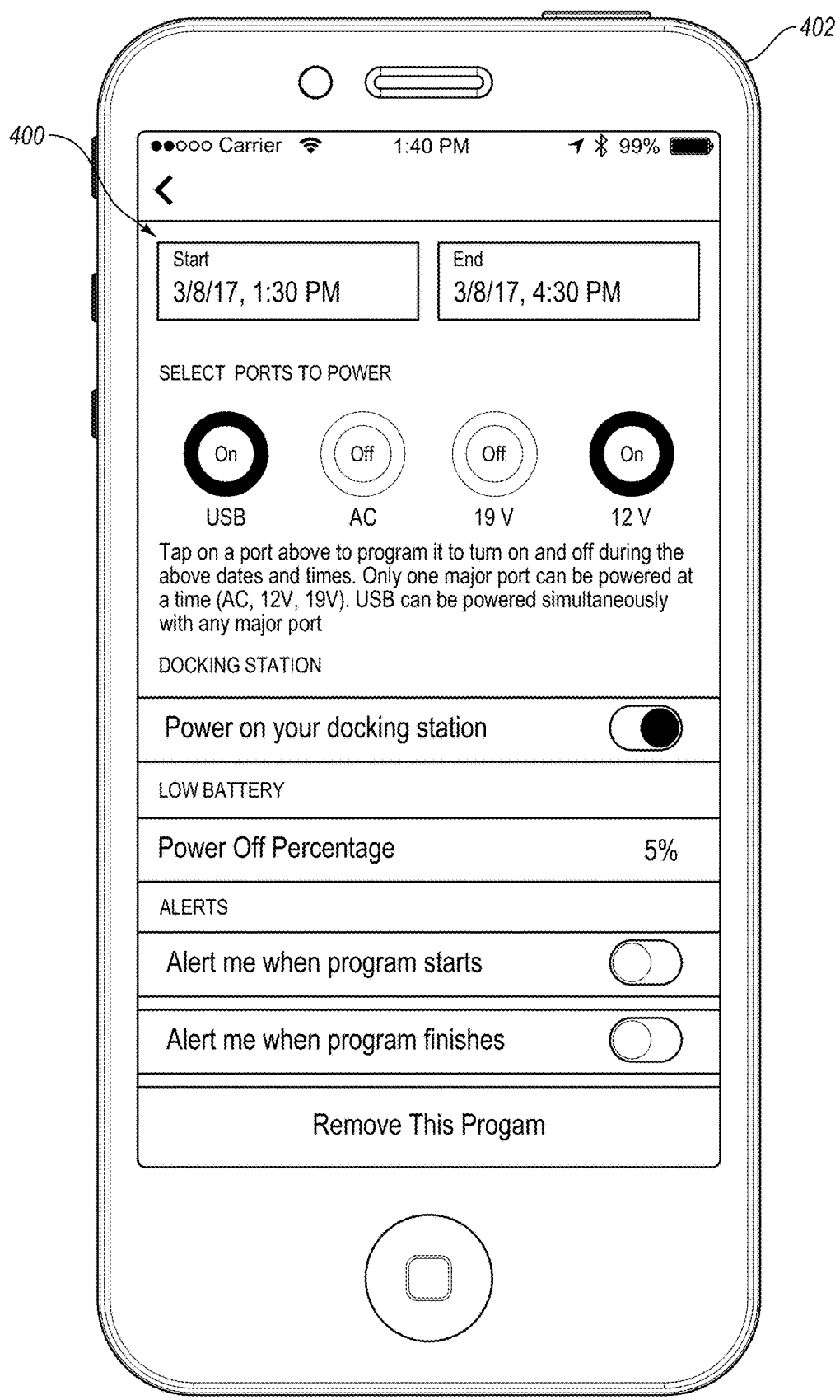
Figure 4H:
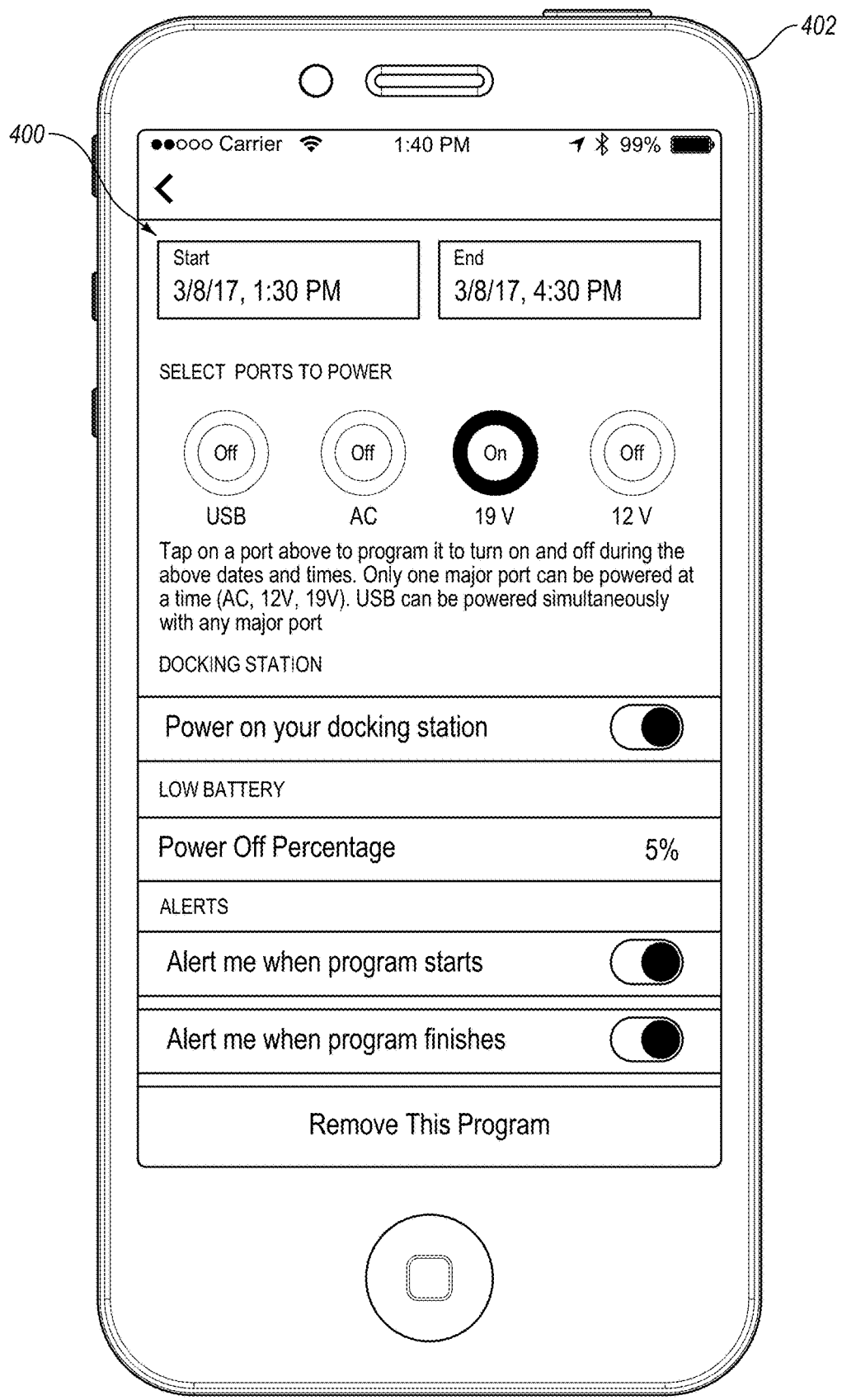

Alternatively, by selecting an option 412 in FIG. 4C, the user is taken to a user interface disclosed in FIG. 4F, where the user can create or edit one or more preset schedules for automatically communicating with the power bank at a preset time, or for setting an internal timer in the power bank itself, to turn one or more power receptacles of the power bank on or off based on the preset schedule. For example, by selecting the preset schedule 414 in FIG. 4F, the user is taken to a user interface disclosed in FIG. 4G, where the user can edit start and end times for the preset schedule 414, select one or more power receptacles to turn on or off according to the preset schedule 414, power on the docking station according to the preset schedule 414, set a preset charge threshold configured to turn one or more power receptacles of the power bank off once a charge percentage of the power bank reaches or drops below the preset charge threshold, present an alert when the preset schedule begins, and/or present an alert when the preset schedule ends. Similarly, by selecting the preset schedule 416 in FIG. 4F, the user is taken to a user interface disclosed in FIG. 4H, where the user has similar options as those disclosed in FIG. 4G.

Figure 4I:
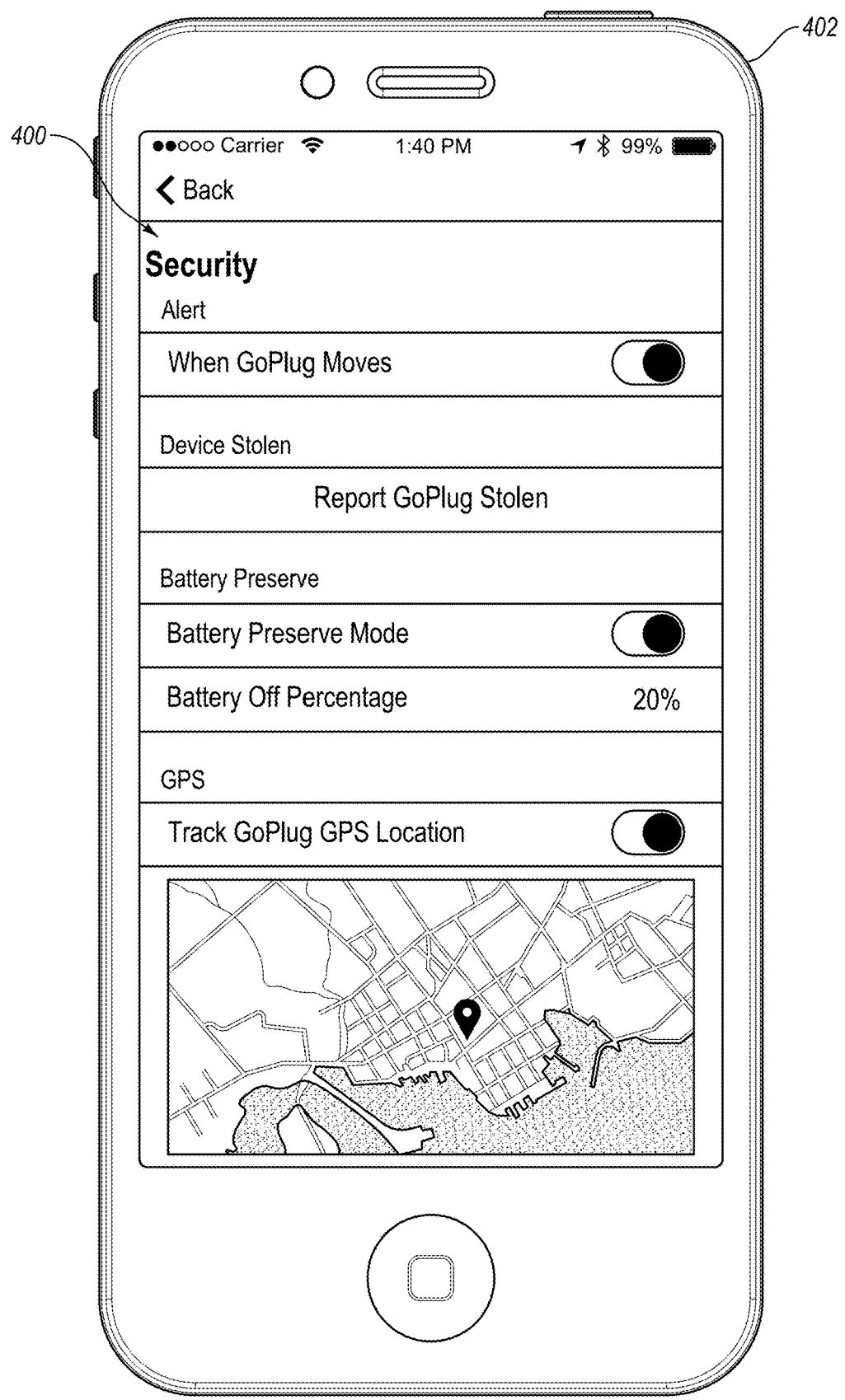

Alternatively, by selecting an option 418 in FIG. 4C, the user is taken to a user interface disclosed in FIG. 4I, where the user can select whether the app 400 will present the user with an alert on a user interface of the app 400 when a geographic position of the power bank changes, and/or when the power bank is moved even slightly, with or without a noticeable change in geographic position. Also, the user interface of FIG. 4I may allow a user to select a GPS tracking feature which tracks the geographical position of the power bank in real-time as the power bank is moved. Further, the user interface of FIG. 4I may allow a user to report that the power bank has been stolen, which may cause the app 400 to communicate with a remote server that can be employed to remotely disable the power bank, track the location of the power bank, and/or take other security measures if the power bank is stolen or if a person in possession of the power bank is missing. Further, similar to the user interfaces of FIGS. 4G and 4H, the user interface of FIG. 4I may allow a user to set a preset charge threshold configured to turn one or more power receptacles of the power bank off once a charge percentage of the power bank reaches or drops below the preset charge threshold. Also, the app 400 may be configured to receive information regarding a current geographic position of the power bank and present the current geographic position of the power bank on the user interface of FIG. 4I. Also, the user interface of FIG. 4I may be modified to allow a user to share information with friends and family related to geographical location and/or send permissions to friends and family to access the power bank remotely over a network, such as a WiFi or GSM network.

Figure 4J:
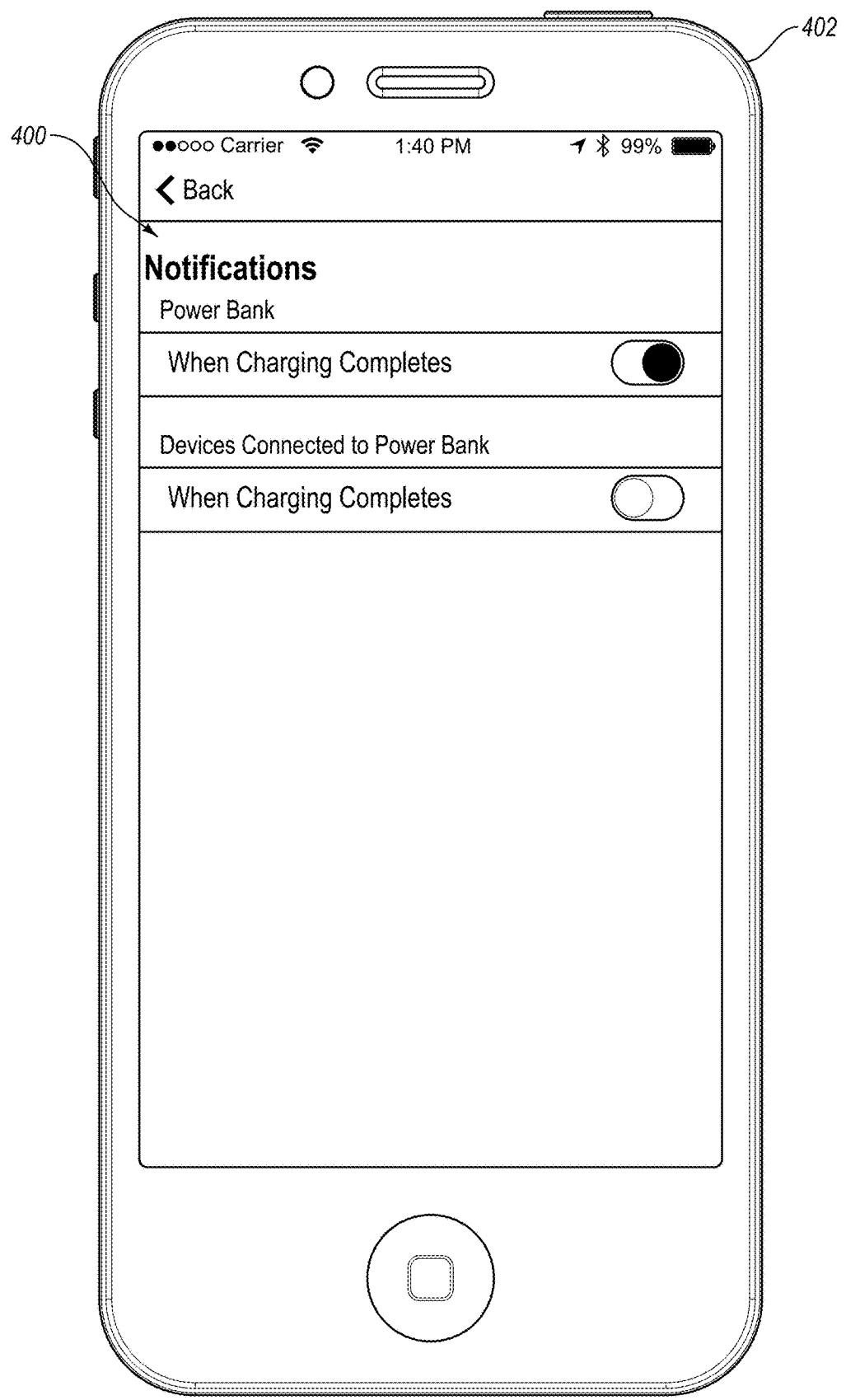

Alternatively, by selecting an option 420 in FIG. 4C, the user is taken to a user interface disclosed in FIG. 4J, where the user can select whether the app 400 will present the user with an alert on a user interface of the app 400 when a charging of the power bank completes, and/or when a device connected to the power bank, and being charged by the power bank, completes charging.

Figure 4K:
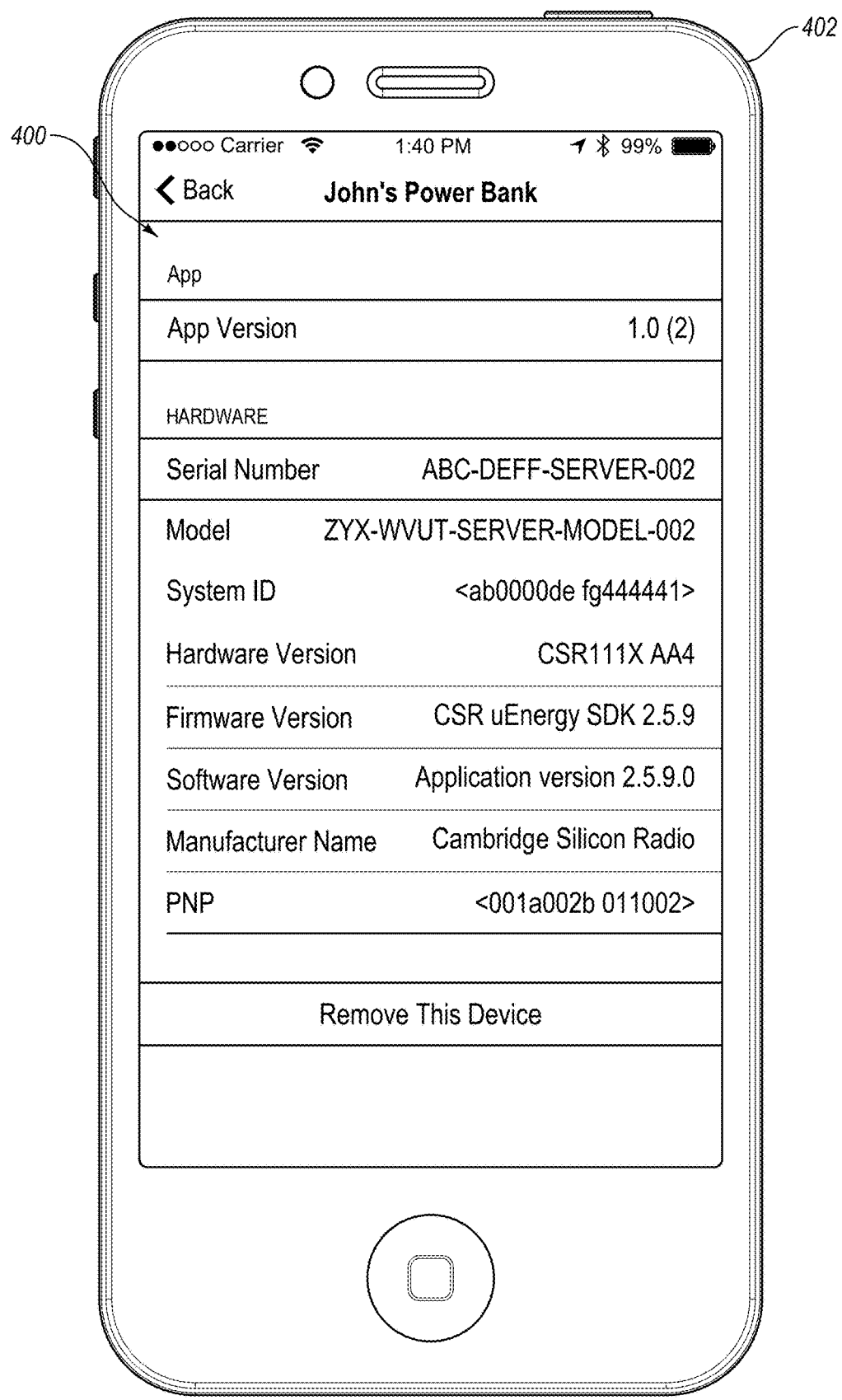

Alternatively, by selecting an option 422 in FIG. 4C, the user is taken to a user interface disclosed in FIG. 4K, where the user is presented with various system information for the app 400, the power bank, and/or the docking station.

In some embodiments, the app 400 may have additional functionality. For example, in some embodiments, the app 400 may be configured to cause the power bank and/or the docking station to function as a mobile hotspot for other wireless devices. For example, the power bank and/or the docking station may be configured to connect to the Internet over a cell phone network or other wireless network or wired network and then function as a WiFi hotspot (or other wireless network hotspot) for other devices. Further, the app 400 may be configured to manage a subscription model where users who do not want to purchase the power bank can rent it at various forums (e.g., college campuses, airports, events, trade shows, conferences, etc). This functionality may allow users a "PAY AS YOU GO" model with subscriptions including, but not limited to, hourly, daily, weekly, and monthly rentals.

The embodiments of the app 400 disclosed herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "app" may refer to software objects or routines that execute on a computing system. The different apps described herein may be implemented as objects or processes that execute on a computing system (e.g., as separate threads). While the system and methods described herein are preferably implemented in software, implementations in hardware or a combination of software and hardware are also possible and contemplated.

It is understood that the receptacles disclosed herein, including the number and types of receptacles included in the power bank and/or the docking station, are only a few examples of countless possible receptacle configurations. For example, although the standard receptacles disclosed herein may be the North American NEMA 5-15 connectors, the universal receptacles disclosed herein may be designed to accept British plugs in addition to Euro, NEMA American and Australian plugs, and the USB receptacles disclosed herein may be standard USB 2.0 dedicated charging ports, it is understood that any other standard or nonstandard electrical receptacles may be employed. For example, electrical receptacles according to any of the following standards may be employed: NEMA 1-15 unpolarised; NEMA 1-15 polarised; JIS C 8303, Class II; NEMA 5-15; NEMA 5-20; JIS C 8303, Class I; CEE 7/16 (Europlug); CEE 7/17; GOST 7396 C 1; BS 4573; BS 546; CEE 7/5; CEE 7/4 Schuko; BS 1363; IS 401 & 411; MS 589; SS 145; SI 32; TIS 166-2549; AS/NZS 3112; CPCS-CCC; IRAM 2073; Swiss SEV 1011: 2009/A1:2012 Typ 12 & Typ 13; Danish 107-2-D1; CEI 23-16/VII; South Africa SABS 164-1; Brazilian NBR 14136 (2 pin); Brazilian NBR 14136 (3 pin); South Africa SABS 164-2 (2 pin); South Africa SABS 164-2 (3 pin); USB 3.0; USB 3.1; USB-C (USB Type-C); USB On-The-Go (OTG); or some combination thereof. Also, a barrel plug may be employed. Further, any of the receptacles disclosed herein may additionally or alternatively be modular such that they may easily be switched out with other receptacles, depending on the standard receptacles in use in different parts of the world. Further, each of the "electrical receptacles" included in the power bank and/or docking station disclosed herein may additionally or alternatively be replaced with a corresponding "electrical plug" or cord that terminates in a corresponding "electrical receptacle" or "electrical plug" to allow electronic devices to be directly attached to this replacement to avoid the user having to carry electrical cords corresponding to each of the user's electronic devices. In other words, the "electrical plug" and/or corresponding "electrical cords" may be built into the power bank and/or docking station disclosed herein.

It is further understood that the bag disclosed herein is only one example of countless bag configurations. For example, bags such as messenger bags, camera bags, sling bags, athletic bags, backpacks, baguette bags, bowling bags, clutch bags, bucket bags, duffel bags, envelope bags, hobo bags, laptop bags, satchel bags, shoulder bags, tote bags, luggage, roller bags, and other types of bags can be employed with the docking power bank disclosed herein. In addition, other types of containers such as tool boxes and lunch boxes can be employed with the docking power bank disclosed herein.

It is also understood that the form factors of the power bank and docking station disclosed herein are example form factors, and other form factors are possible and contemplated. For example, a form factor for a 5V power bank and docking station may be smaller than the form factors disclosed herein, or be shaped differently or have slightly different characteristics than the form factors disclosed herein, but still benefit from various of the other characteristics of the power bank and docking station disclosed herein, such as the magnetic docking capability for example.

It is further understood that multiple power banks may be combined into an array of power banks in order to provide more power collectively that each individual power bank is able to provide individually. Such an array may be facilitated, for example, by electrically connecting multiple docking stations, and the docking multiple power banks with the electrically-connected docking stations. For example, when multiple docking stations are electrically connected in series, the voltage of the corresponding power banks may be increased while maintaining the same capacity. Alternatively, when multiple docking stations are electrically connected in parallel, the capacity of the corresponding power banks may be increased while maintaining the same voltage. In some embodiments, an array of power banks may be facilitated by electrically connecting and mounting multiple docking stations, or their electrical equivalent, in a bag such as a piece of luggage or a large briefcase, and then providing space in the same bag for the corresponding power banks, thus creating both an electrical array as well as a physically compact container for transporting and using the electrical array.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A portable power bank system comprising:
a portable power bank including a power bank housing, one or more batteries internal to the power bank housing, and one or more electrical receptacles that are defined by and integral to the power bank housing, each of the one or more electrical receptacles configured to selectively provide electrical power from the one or more batteries to any plug that is plugged into the electrical receptacle; and
a software application including one or more computer-readable instructions that are configured, when executed by one or more processors of a portable computing device, to cause the portable computing device to:
communicate with the portable power bank over a wireless network to receive information regarding a current state of the portable power bank and to present the current state of the portable power bank on the portable computing device; and
communicate with the portable power bank over the wireless network to turn power flow to the one or more electrical receptacles of the portable power bank off once a charge percentage of the portable power bank reaches or drops below a preset charge threshold.

2. The portable power bank system of claim 1, wherein the one or more computer-readable instructions are further configured, when executed by the one or more processors of the portable computing device, to cause the portable computing device to:

communicate with the portable power bank over the wireless network to control functionality of the portable power bank.

3. The portable power bank system of claim 1, wherein the one or more computer-readable instructions are further configured, when executed by the one or more processors of the portable computing device, to cause the portable computing device to:

communicate with the portable power bank over the wireless network to cause the portable power bank to connect to the Internet over a wireless cell phone network and then function as a mobile WiFi hotspot for other wireless devices.

4. The portable power bank system of claim 1, wherein the one or more computer-readable instructions are further configured, when executed by the one or more processors of the portable computing device, to cause the portable computing device to:

communicate with the portable power bank over the wireless network to turn power flow to the one or more electrical receptacles of the portable power bank on or off.

5. The portable power bank system of claim 1, wherein the one or more computer-readable instructions are further configured, when executed by the one or more processors of the portable computing device, to cause the portable computing device to:

automatically communicate with the portable power bank at a preset time over the wireless network to turn power flow to the one or more electrical receptacles of the portable power bank on or off on a preset schedule.

6. The portable power bank system of claim 5, wherein the one or more computer-readable instructions are further configured, when executed by the one or more processors of the portable computing device, to cause the portable computing device to:

automatically communicate with the portable power bank at a preset time over the wireless network to present an alert on the portable computing device when the preset schedule begins and/or to present an alert on the portable computing device when the preset schedule ends.

7. The portable power bank system of claim 1, wherein the one or more computer-readable instructions are further configured, when executed by the one or more processors of the portable computing device, to cause the portable computing device to:

communicate with the portable power bank over the wireless network to allow a user to selectively turn off power flow to one of the one or more electrical receptacles of the portable power bank while power flow remains turned on to another one of the one or more electrical receptacles of the portable power bank.

8. The portable power bank system of claim 1, wherein the one or more computer-readable instructions are further configured, when executed by the one or more processors of the portable computing device, to cause the portable computing device to:

communicate with the portable power bank over the wireless network to allow a user to turn the portable power bank on or off.

9. The portable power bank system of claim 1, wherein the one or more computer-readable instructions are further configured, when executed by the one or more processors of the portable computing device, to cause the portable computing device to:

communicate with the portable power bank over the wireless network to present an alert on the portable computing device when a geographic position of the portable power bank changes.

10. The portable power bank system of claim 1, wherein the one or more computer-readable instructions are further configured, when executed by the one or more processors of the portable computing device, to cause the portable computing device to:

communicate with the portable power bank over the wireless network to present an alert on the portable computing device when the portable power bank is moved without a noticeable change in a geographic position of the portable power bank.

11. The portable power bank system of claim 1, wherein the one or more computer-readable instructions are further configured, when executed by the one or more processors of the portable computing device, to cause the portable computing device to:

communicate with the portable power bank over the wireless network to receive information regarding a real-time geographic position of the portable power bank as the portable power bank is moved and to present the real-time geographic position of the portable power bank on the portable computing device as the portable power bank is moved.

12. The portable power bank system of claim 1, wherein the one or more computer-readable instructions are further configured, when executed by the one or more processors of the portable computing device, to cause the portable computing device to:

communicate with a remote server to remotely disable the portable power bank.

13. The portable power bank system of claim 1, wherein the one or more computer-readable instructions are further configured, when executed by the one or more processors of the portable computing device, to cause the portable computing device to:

communicate with a remote server to remotely track a real-time geographic position of the portable power bank as the portable power bank is moved and to present the real-time geographic position of the portable power bank on the portable computing device as the power bank is moved.

14. The portable power bank system of claim 1, wherein the one or more computer-readable instructions are further configured, when executed by the one or more processors of the portable computing device, to cause the portable computing device to:

communicate with a remote server to remotely track a real-time geographic position of the portable power bank if a person in possession of the portable power bank is missing and to present the real-time geographic position of the portable power bank on the portable computing device as the portable power bank is moved with the missing person.

15. The portable power bank system of claim 1, wherein the one or more computer-readable instructions are further configured, when executed by the one or more processors of the portable computing device, to cause the portable computing device to:

communicate with a remote server to allow a user to remotely share information with other users related to a real-time geographical location of the portable power bank.

16. The portable power bank system of claim 1, wherein the one or more computer-readable instructions are further configured, when executed by the one or more processors of the portable computing device, to cause the portable computing device to:

communicate with a remote server to allow a user to remotely send permission to other users over a wireless network.

17. The portable power bank system of claim 1, wherein the one or more computer-readable instructions are further configured, when executed by the one or more processors of the portable computing device, to cause the portable computing device to:

communicate with the portable power bank over the wireless network to present an alert on the portable computing device when a charging of the portable power bank completes.

18. The portable power bank system of claim 1, wherein the one or more computer-readable instructions are further configured, when executed by the one or more processors of the portable computing device, to cause the portable computing device to:

communicate with the portable power bank over the wireless network to present an alert on the portable computing device when a portable electronic device connected to the portable power bank, and being charged by the portable power bank, completes charging.

* * * * *